US011941689B2

(12) United States Patent
Garg et al.

(10) Patent No.: US 11,941,689 B2
(45) Date of Patent: Mar. 26, 2024

(54) METHOD AND SYSTEM FOR ACCEPTING PAYMENTS ON MOBILE APPLICATION

(71) Applicant: JPMorgan Chase Bank, N.A., New York, NY (US)

(72) Inventors: Jatin Garg, Frisco, TX (US); Jasbir Banga, Swedesboro, NJ (US); Nirmal Kumar, Frisco, TX (US); Ted Hellman, Fairfax, CA (US); Mizan Miah, Wilmington, DE (US); Ryan S Yoder, Tampa, FL (US); Mohamed Abdullah, Frisco, TX (US); Angela Govila, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 156 days.

(21) Appl. No.: 17/113,998

(22) Filed: Dec. 7, 2020

(65) Prior Publication Data

US 2022/0180428 A1    Jun. 9, 2022

(51) Int. Cl.
*G06Q 40/02*    (2023.01)
*G06Q 20/02*    (2012.01)
(Continued)

(52) U.S. Cl.
CPC .............. *G06Q 40/02* (2013.01); *G06Q 20/02* (2013.01); *G06Q 20/047* (2020.05);
(Continued)

(58) Field of Classification Search
CPC ...... G06Q 40/02; G06Q 20/02; G06Q 20/047; G06Q 20/085; G06Q 20/108;
(Continued)

(56) References Cited

U.S. PATENT DOCUMENTS 8,930,271 B1 * 1/2015 Ellis ................... G06Q 30/0224
705/41
9,443,118 B1 * 9/2016 Templeton ............. G06K 7/084
(Continued)

FOREIGN PATENT DOCUMENTS

GB          2477348 A  *  8/2011  ............. G06K 13/08

OTHER PUBLICATIONS

Stolyar, Brenda (Sep. 17, 2017). Zelle fixes the instant money problem other payment services suffer from. Digital Trends ("Zelle").*
(Continued)

*Primary Examiner* — Peter Ludwig
(74) *Attorney, Agent, or Firm* — GREENBLUM & BERNSTEIN, P.L.C.

(57) ABSTRACT

A system and a method for accepting a payment on an application is provided. The method is implemented by a processor. The processor receives login information from a client to activate a banking application; selects quick accept entry points associated with the client's business banking demand deposit account (DDA) based on determining that the client is eligible for the quick accept entry points in response to the login information; sets up a payment receiving option for receiving a payment via the banking application; causes the banking application to receive transaction amount data corresponding to a transaction between the client and a customer; causes the banking application to process the transaction amount data; and automatically updates the DDA to reflect receipt of the transaction amount data.

20 Claims, 6 Drawing Sheets

(51) Int. Cl.
  *G06Q 20/04* (2012.01)
  *G06Q 20/08* (2012.01)
  *G06Q 20/10* (2012.01)
  *G06Q 20/20* (2012.01)
  *G06Q 20/34* (2012.01)
  *G06Q 40/12* (2023.01)
  *H04W 4/80* (2018.01)
  *H04W 76/10* (2018.01)

(52) U.S. Cl.
  CPC ......... *G06Q 20/085* (2013.01); *G06Q 20/108* (2013.01); *G06Q 20/204* (2013.01); *G06Q 20/209* (2013.01); *G06Q 20/356* (2013.01); *G06Q 40/12* (2013.12); *H04W 4/80* (2018.02); *H04W 76/10* (2018.02)

(58) Field of Classification Search
  CPC .. G06Q 20/204; G06Q 20/209; G06Q 20/356; G06Q 40/12; H04W 4/80; H04W 76/10
  See application file for complete search history.

(56) References Cited

U.S. PATENT DOCUMENTS

| | | | |
|---|---|---|---|
| 11,132,678 B1* | 9/2021 | Medina, III | G06Q 20/20 |
| 11,216,273 B1* | 1/2022 | Story | G06F 8/71 |
| 2014/0208389 A1* | 7/2014 | Kelley | H04L 63/08 |
| | | | 726/4 |
| 2017/0004475 A1* | 1/2017 | White | G06Q 20/3567 |
| 2018/0173856 A1* | 6/2018 | Ahmed | H04L 63/0815 |
| 2019/0253840 A1* | 8/2019 | Bakshi | H04W 4/50 |
| 2021/0103961 A1* | 4/2021 | Phillips | G06Q 40/02 |
| 2021/0117965 A1* | 4/2021 | Venot | G06Q 20/34 |
| 2021/0326978 A1* | 10/2021 | Hsu | G06Q 40/025 |
| 2022/0076234 A1* | 3/2022 | Bodalia | G06Q 20/3274 |

OTHER PUBLICATIONS

PCI Data Security Standard (PCI DDS) (Feb. 2013), Cloud Special Interest Group PCI Security Standards Council ("PCI").*

* cited by examiner

METHOD AND SYSTEM FOR ACCEPTING PAYMENTS ON MOBILE APPLICATION

BACKGROUND

1. Field of the Disclosure

This technology generally relates to methods and systems for accepting payments, and more particularly to methods and systems for implementing a payment accepting application that allows clients to accept card payments from customers directly on the payment accepting application, with automatic settlement to the clients' demand deposit account (DDA).

2. Background Information

Existing business bank clients who would find value in various merchant services (e.g., Chase Merchant Services) for occasional use typically face an onerous on boarding experience. In addition, such business bank clients have to use a separate set of tools to accept payments from their customers. Current business bank applications lack payment acceptance means to meet a wider base of clients to accept payments from their customers. Typical retail banking application is not designed for accepting credit card payment. Accepting credit card payment may involve challenges related to complying with Payment and Card Industry-Data Security Standard (PCI-DSS), which may prove to be a huge burden on the application to handle the sensitive data on its platform.

Thus, there is a need for a solution where a client can accept credit card payment from his/her customer by key in the 15/16 digit credit or debit card number and still keeping the application outside of PCI-DSS compliance scope.

SUMMARY

The present disclosure, through one or more of its various aspects, embodiments, and/or specific features or sub-components, provides, among others, various systems, servers, devices, methods, media, programs, and platforms for implementing a banking application (i.e., a mobile banking application) that allows clients to accept card payments from customers directly on the banking application, while keeping the banking application outside of PCI-DSS compliance scope, with automatic settlement to the clients' DDA.

According to an aspect of the present disclosure, a method for accepting a payment on an application by implementing one or more processors and one or more memories is disclosed. The method may include: receiving login information from a client to activate a banking application; selecting quick accept entry points associated with the client's business banking demand deposit account (DDA) based on determining that the client is eligible for the quick accept entry points in response to the login information; setting up a payment receiving option for receiving a payment via the banking application; receiving, by the banking application, transaction amount data corresponding to a transaction between the client and a customer; processing, by the banking application, the transaction amount data; and automatically updating the DDA to reflect receipt of the transaction amount data.

According to another aspect of the present disclosure, wherein processing the transaction amount data may further include: receiving, by the banking application, card information for charging the transaction amount data; and processing, by the banking application, the transaction amount data based on the card information.

According to a further aspect of the present disclosure, wherein processing the transaction amount data may further include: displaying a plurality of selectable card reader devices on a dashboard of the banking application, wherein the plurality of selectable card reader devices are configured to be paired with the banking application via a wireless communication that is performed in accordance with a Bluetooth standard; pairing, for one-time use only, the banking application with a desired card reader device from the plurality of selectable card reader devices via the Bluetooth standard, wherein the card reader device includes a terminal that is configured to obtain the transaction amount data from a card that is associated with customer; and accepting payment of the transaction amount data in response to dipping, or swiping, or tapping the card.

According to yet another aspect of the present disclosure, wherein processing the transaction amount data may further include: connecting a card reader device with the banking application via a wired communication that is performed in accordance with a Universal Serial Bus (USB) standard, wherein the card reader device includes a terminal that is configured to obtain the transaction amount data from a card that is associated with the customer; and accepting payment of the transaction amount data in response to dipping, or swiping, or tapping the card.

According to another aspect of the present disclosure, the method may further include: establishing a communication between the banking application and an email server that serves an email account of the customer; and transmitting an email notification attaching a receipt to the email account of the customer upon receipt of the transaction amount data.

According to a further aspect of the present disclosure, the method may further include accessing reporting data on charge and settlement associated with the transaction amount data from within the banking application on a mobile device of the client.

According to yet another aspect of the present disclosure, the method may further include accessing reporting data on charge and settlement associated with the transaction amount data from within the business banking DDA of the client held by a financial institution.

According to another aspect of the present disclosure, a system for accepting a payment on an application is disclosed. The system may include a processor, a server, and one or more memories operatively connected to the processor via a communication network. The processor may be configured to: receive login information from a client to activate a banking application; select quick accept entry points associated with the client's business banking demand deposit account (DDA) based on determining that the client is eligible for the quick accept entry points in response to the login information; set up a payment receiving option for receiving a payment via the banking application; cause the banking application to receive transaction amount data corresponding to a transaction between the client and a customer, cause the banking application to process the transaction amount data, and automatically update the DDA to reflect receipt of the transaction amount data.

According to a further aspect of the present disclosure, wherein, to process the transaction amount data, the processor may be further configured to: cause the banking application to receive card information for charging the transaction amount data; and cause the banking application to process the transaction amount data based on the card information.

According to yet another aspect of the present disclosure, wherein, to process the transaction amount data, the processor may be further configured to: display a plurality of selectable card reader devices on a dashboard of the banking application, wherein the plurality of selectable card reader devices are configured to be paired with the banking application via a wireless communication that is performed in accordance with a Bluetooth standard; pair, for one-time use only, the banking application with a desired card reader device from the plurality of selectable card reader devices via the Bluetooth standard, wherein the card reader device includes a terminal that is configured to obtain the transaction amount data from a card that is associated with customer; and accept payment of the transaction amount data in response to dipping, or swiping, or tapping the card.

According to another aspect of the present disclosure, wherein, to process the transaction amount data, the processor may be further configured to: establish a communication link between a card reader device and the banking application via a wired communication that is performed in accordance with a Universal Serial Bus (USB) standard, wherein the card reader device includes a terminal that is configured to obtain the transaction amount data from a card that is associated with the customer; and accept a payment of the transaction amount data in response to dipping, or swiping, or tapping the card.

According to a further aspect of the present disclosure, the processor may be further configured to: establish a communication link between the banking application and an email server that serves an email account of the customer; and transmit an email notification attaching a receipt to the email account of the customer upon receipt of the transaction amount data.

According to yet another aspect of the present disclosure, the processor may be further configured to access reporting data on charge and settlement associated with the transaction amount data from within the banking application on a mobile device of the client.

According to an additional aspect of the present disclosure, the processor may be further configured to access reporting data on charge and settlement associated with the transaction amount data from within the business banking DDA of the client held by a financial institution.

According to yet another aspect of the present disclosure, a non-transitory computer readable medium configured to store instructions for accepting a payment on an application is disclosed. The instructions, when executed, may cause a processor to perform the following: receive login information from a client to activate a banking application; select quick accept entry points associated with the client's business banking demand deposit account (DDA) based on determining that the client is eligible for the quick accept entry points in response to the login information, set up a payment receiving option for receiving a payment via the banking application; cause the banking application to receive transaction amount data corresponding to a transaction between the client and a customer; cause the banking application to process the transaction amount data; and automatically update the DDA to reflect receipt of the transaction amount data.

According to a further aspect of the present disclosure, wherein, to process the transaction amount data, the instructions, when executed by the processor, may cause the processor to further perform the following: cause the banking application to receive card information for charging the transaction amount data; and cause the banking application to process the transaction amount data based on the card information.

According to yet another aspect of the present disclosure, wherein, to process the transaction amount data, the instructions, when executed by the processor, may cause the processor to further perform the following: display a plurality of selectable card reader devices on a dashboard of the banking application, wherein the plurality of selectable card reader devices are configured to be paired with the banking application via a wireless communication that is performed in accordance with a Bluetooth standard; pair, for one-time use only, the banking application with a desired card reader device from the plurality of selectable card reader devices via the Bluetooth standard, wherein the card reader device includes a terminal that is configured to obtain the transaction amount data from a card that is associated with customer; and accept payment of the transaction amount data in response to dipping, or swiping, or tapping the card.

According to another aspect of the present disclosure, wherein, to process the transaction amount data, the instructions, when executed by the processor, may cause the processor to further perform the following: establish a communication link between a card reader device and the banking application via a wired communication that is performed in accordance with a Universal Serial Bus (USB) standard, wherein the card reader device includes a terminal that is configured to obtain the transaction amount data from a card that is associated with the customer; and accept a payment of the transaction amount data in response to dipping, or swiping, or tapping the card.

According to a further aspect of the present disclosure, the instructions, when executed by the processor, may cause the processor to further perform the following: establish a communication link between the banking application and an email server that serves an email account of the customer, and transmit an email notification attaching a receipt to the email account of the customer upon receipt of the transaction amount data.

According to yet another aspect of the present disclosure, the instructions, when executed by the processor, may cause the processor to further perform the following: access reporting data on charge and settlement associated with the transaction amount data from within the banking application on a mobile device of the client.

According to a further aspect of the present disclosure, the instructions, when executed by the processor, may cause the processor to further perform the following: access reporting data on charge and settlement associated with the transaction amount data from within the business banking DDA of the client held by a financial institution.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
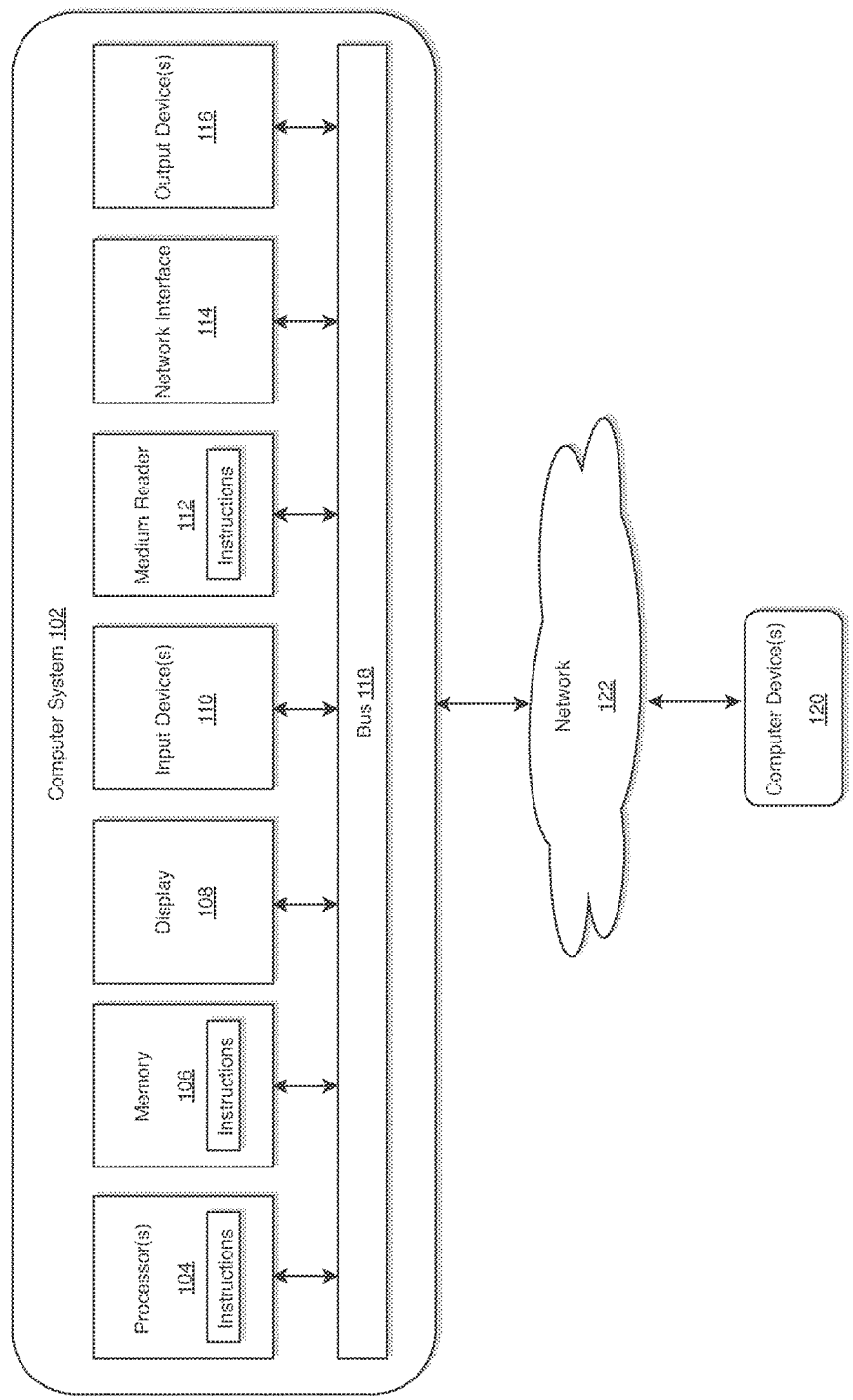
FIG. 1 illustrates a computer system for accepting a payment on an application in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein for accepting a payment on an application, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
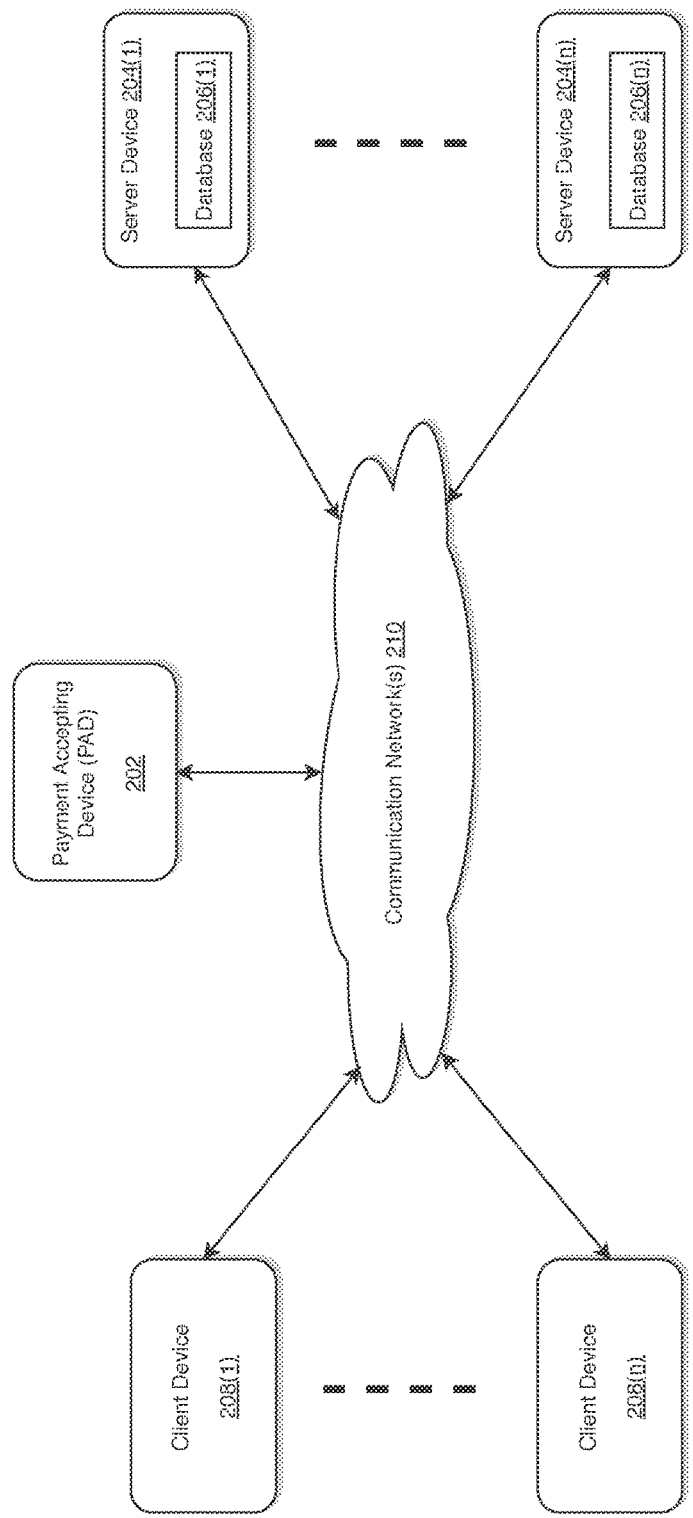
FIG. 2 illustrates an exemplary diagram of a network environment with a payment accepting device that implements a method for directly accepting a payment on an application in accordance with an exemplary embodiment.

Referring to FIG. 2, a schematic of an exemplary network environment 200 for implementing a payment accepting device (PAD) of the instant disclosure is illustrated that implements a method for directly accepting a payment on an application (i.e., a quick banking application developed by the inventors of the instant application).

According to exemplary embodiments, the above-described problems associated with conventional systems may be overcome by implementing a PAD 202 as illustrated in FIG. 2 that may provide a platform for implementing a method for directly accepting card payments from customers directly on a payment accepting application, with automatic settlement to the clients' DDA, but the disclosure is not limited thereto.

The PAD 202 may be the same or similar to the computer system 102 as described with respect to FIG. 1.

The PAD 202 may store one or more applications that can include executable instructions that, when executed by the PAD 202, cause the PAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PAD 202 itself, may be located in virtual server(s) running in a cloud-based computing environment rather than being tied to one or more specific physical network computing devices. Also, the application(s) may be running in one or more virtual machines (VMs) executing on the PAD 202. Additionally, in one or more embodiments of this technology, virtual machine(s) running on the PAD 202 may be managed or supervised by a hypervisor.

In the network environment 200 of FIG. 2, the PAD 202 is coupled to a plurality of server devices 204(1)-204(n) that hosts a plurality of databases 206(1)-206(n) including adaptive data storages, and also to a plurality of client devices 208(1)-208(n) via communication network(s) 210. A communication interface of the PAD 202, such as the network interface 114 of the computer system 102 of FIG. 1, operatively couples and communicates between the PAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PAD 202 may be a standalone device or integrated with one or more other devices or apparatuses, such as one or more of the server devices 204(1)-204(n), for example. In one particular example, the PAD 202 may be hosted by one of the server devices 204(1)-204(n), and other arrangements are also possible. Moreover, one or more of the devices of the PAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PAD 202 via the communication network(s) 210 according to the HTTP-based, HTTPS-based, and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the PAD 202 that may efficiently provide a platform for implementing the PAD 202 which may be configured to implement a payment accepting application that allows clients to accept card payments from customers directly on the payment accepting application, with automatic settlement to the clients' DDA, but the disclosure is not limited thereto.

The client devices 208(1)-208(n) may run interface applications, such as standard web browsers or standalone client applications, which may provide an interface to communicate with the PAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the PAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PAD 202, the server devices 204(1)-204(n), or the client devices 208(1)-208(n), for example, may be configured to operate as virtual instances on the same physical machine. For example, one or more of the PAD 202, the server devices 204(1)-204(n), or the client devices 208(1)-208(n) may operate on the same physical device rather than as separate devices communicating through communication network(s) 210. Additionally, there may be more or fewer PADs 202, server devices 204(1)-204(n), or client devices 208(1)-208(n) than illustrated in FIG. 2. According to exemplary embodiments, the PAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
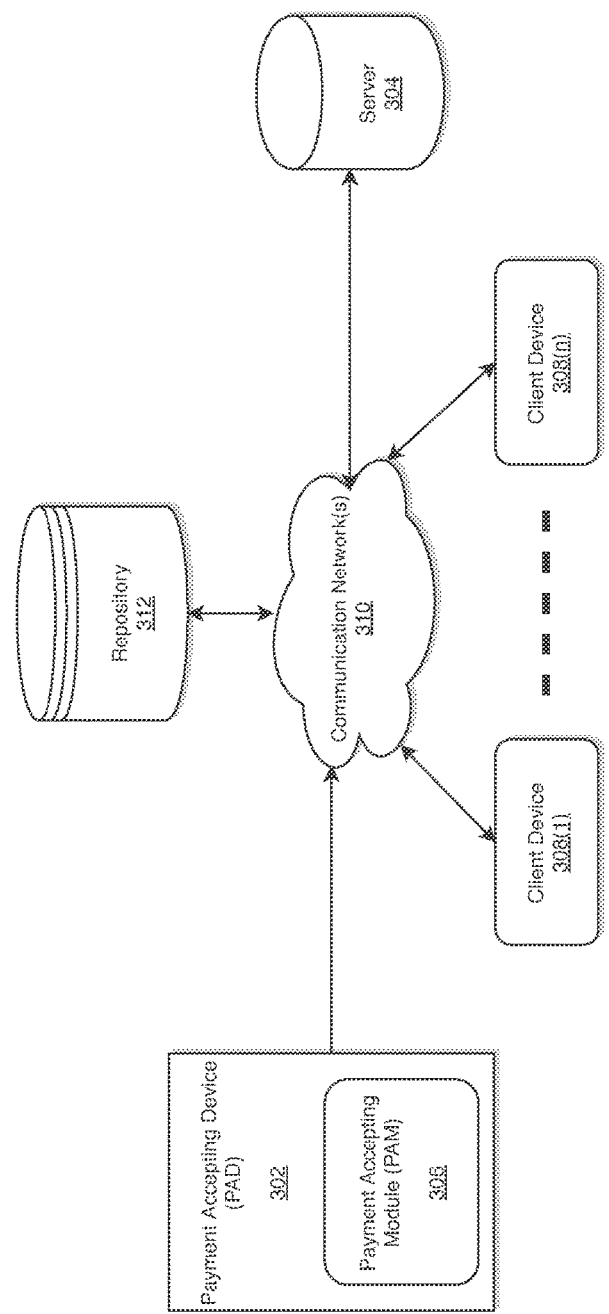
FIG. 3 illustrates a system diagram for implementing a payment accepting device of FIG. 2 having a payment accepting module in accordance with an exemplary embodiment.

FIG. 3 illustrates a system diagram for implementing a PAD having a payment accepting module (PAM) in accordance with an exemplary embodiment.

As illustrated in FIG. 3, the PAD 302 including the PAM 306 may be connected to a server 304, and a repository 312 via a communication network 310. The PAD 302 may also be connected to a plurality of client devices 308(1)-308(n) via the communication network 310, but the disclosure is not limited thereto. According to exemplary embodiments, the PAM 306 may be implemented within the client devices 308(1)-308(n), but the disclosure is not limited thereto. According to exemplary embodiments, the client devices 308(1)-308(n) may be utilized by business banking merchants who would like to receive card payments from customers on the banking application, but the disclosure is not limited thereto.

According to exemplary embodiment, the PAD 302 is described and shown in FIG. 3 as including the PAM 306, although it may include other rules, policies, modules, databases, or applications, for example. According to exemplary embodiments, the repository 312 may be embedded within the PAD 302. Although only one repository 312 is illustrated in FIG. 3, according to exemplary embodiments, a plurality of repositories 312 may be provided. The repository 312 may include one or more memories configured to store trade capture data, operational capture data, other contributor data, etc., but the disclosure is not limited thereto. For example, the repository 312 may include one or more memories configured to store information including: rules, programs, requirements, configurable threshold values defined by a product team to validate against service level objective (SLO), machine learning models, log data, hash values, etc., but the disclosure is not limited thereto. According to exemplary embodiments, the PAM 306 may be configured to be storage platform agnostic—configured to be deployed across multiple storage layers.

According to exemplary embodiments, the PAM 306 may be configured to receive continuous feed of data from the repository 312 via the communication network 310.

As will be described below, the PAM 306 may be configured to receive login information from a client to activate a banking application; select quick accept entry points associated with the client's business banking demand deposit account (DDA) based on determining that the client is eligible for the quick accept entry points in response to the login information; set up a payment receiving option for receiving a payment via the banking application; cause the banking application to receive transaction amount data corresponding to a transaction between the client and a customer; cause the banking application to process the transaction amount data, and automatically update the DDA to reflect receipt of the transaction amount data, but the disclosure is not limited thereto.

The plurality of client devices 308(1)-308(n) are illustrated as being in communication with the PAD 302. In this regard, the plurality of client devices 308(1)-308(n) may be "clients" of the PAD 302 and are described herein as such. Nevertheless, it is to be known and understood that the plurality of client devices 308(1)-308(n) need not necessarily be "clients" of the PAD 302, or any entity described in association therewith herein. Any additional or alternative relationship may exist between either or more of the plurality of client devices 308(1)-308(n) and the PAD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the PAD 302 via broadband or cellular communication. Of course, these embodiments are merely exemplary and are not limiting or exhaustive.

Figure 4:
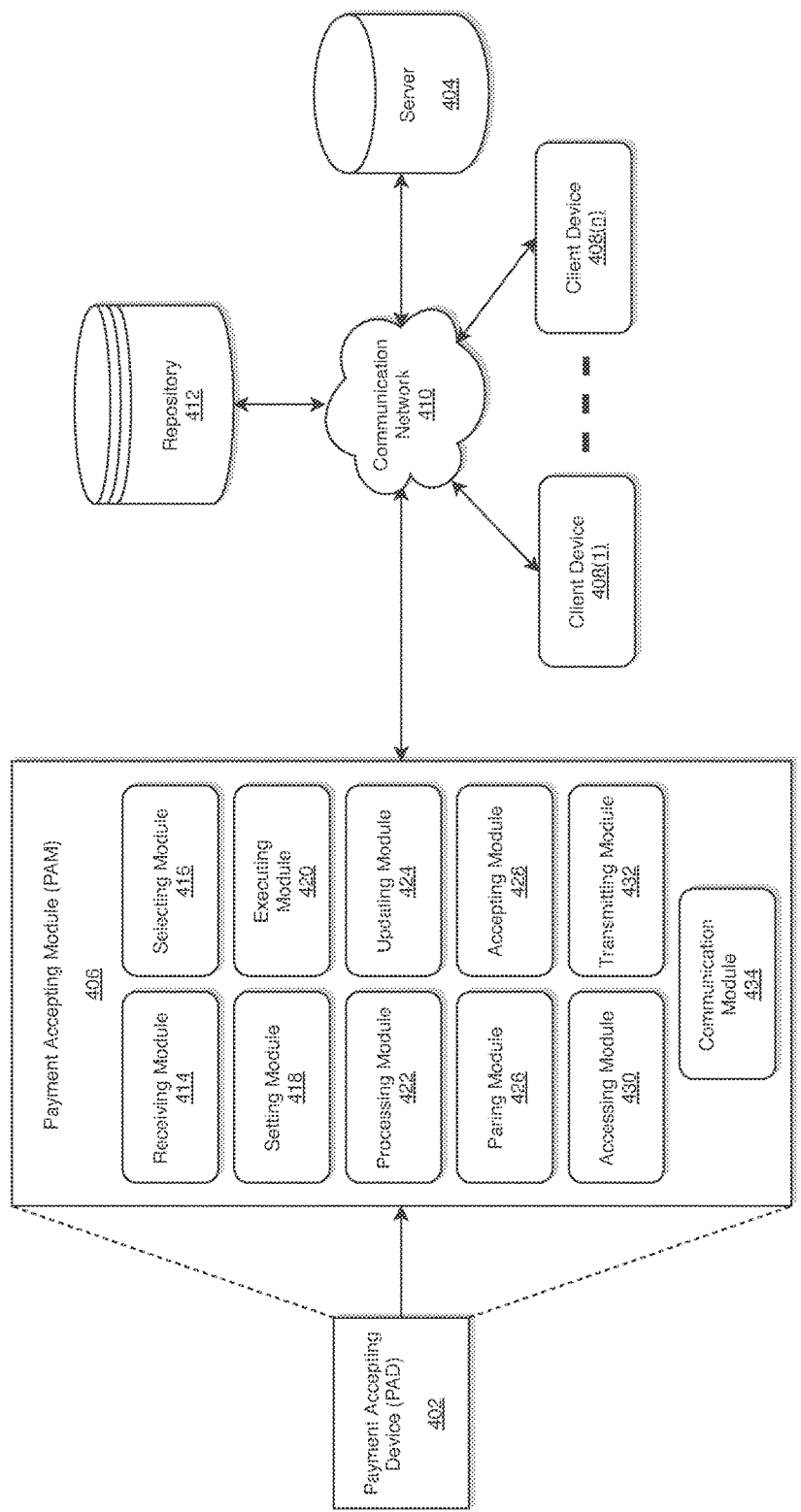
FIG. 4 illustrates a system diagram having a payment accepting module of FIG. 3 that implements a method for directly accepting a payment on an application in accordance with an exemplary embodiment.

FIG. 4 illustrates a system diagram having a PAM of FIG. 3 in accordance with an exemplary embodiment.

As illustrated in FIG. 4, the system 400 may include a PAD 402 within which a PAM 406 may be embedded, a repository 412, a server 404, client devices 408(1)-408(n), and a communication network 410. According to exemplary embodiments, the PAD 402, PAM 406, repository 412, the server 404, the client devices 408(1)-408(n), and the communication network 410 as illustrated in FIG. 4 may be the same or similar to the PAD 302, the PAM 306, the repository 312, the server 304, the client devices 308(1)-308(n), and the communication network 310, respectively, as illustrated in FIG. 3.

According to exemplary embodiments, the repository 312, 412 may be a cloud-based repository that supports user authentication, repository security, and integration with existing databases and developments, but the disclosure is not limited thereto.

As illustrated in FIG. 4, the PAM 406 may include a receiving module 414, a selecting module 416, a setting module 418, an executing module 420, a processing module 422, an updating module 424, a paring module 426, an accepting module 428, an accessing module 430, a transmitting module 432, and a communication module 434. According to exemplary embodiments, the repository 412 and server 404 may be external to the PAD 402 may include various systems that are managed and operated by an organization.

The process may be executed via the communication module 434 and the communication network 410 which may comprise plural networks as described above. For example, in an exemplary embodiment, the various components of the PAM 406 may communicate with the server 404, and the repository 412 via the communication module 434 and the communication network 410. Of course, these embodiments are merely exemplary and are not limiting or exhaustive.

According to exemplary embodiments, the communication network 410 and the communication module 434 may be configured to establish a link between the repository 412, the client devices 408(1)-408(n) and the PAM 406.

According to exemplary embodiments, each of the receiving module 414, selecting module 416, setting module 418, executing module 420, processing module 422, updating module 424, paring module 426, accepting module 428, accessing module 430, transmitting module 432, and the communication module 434 may be implemented by microprocessors or similar, they may be programmed using software (e.g., microcode) to perform various functions discussed herein and may optionally be driven by firmware and/or software. Alternatively, each of the receiving module 414, selecting module 416, setting module 418, executing module 420, processing module 422, updating module 424, paring module 426, accepting module 428, accessing module 430, transmitting module 432, and the communication module 434 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, selecting module 416, setting module 418, executing module 420, processing module 422, updating module 424, paring module 426, accepting module 428, accessing module 430, transmitting module 432, and the communication module 434 may be physically separated into two or more interacting and discrete blocks, units, devices, and/or modules without departing from the scope of the inventive concepts.

According to exemplary embodiments, each of the receiving module 414, selecting module 416, setting module 418, executing module 420, processing module 422, updating module 424, paring module 426, accepting module 428, accessing module 430, transmitting module 432, and the communication module 434 of the PAM 406 may be invoked by corresponding API, but the disclosure is not limited thereto.

Figure 5:
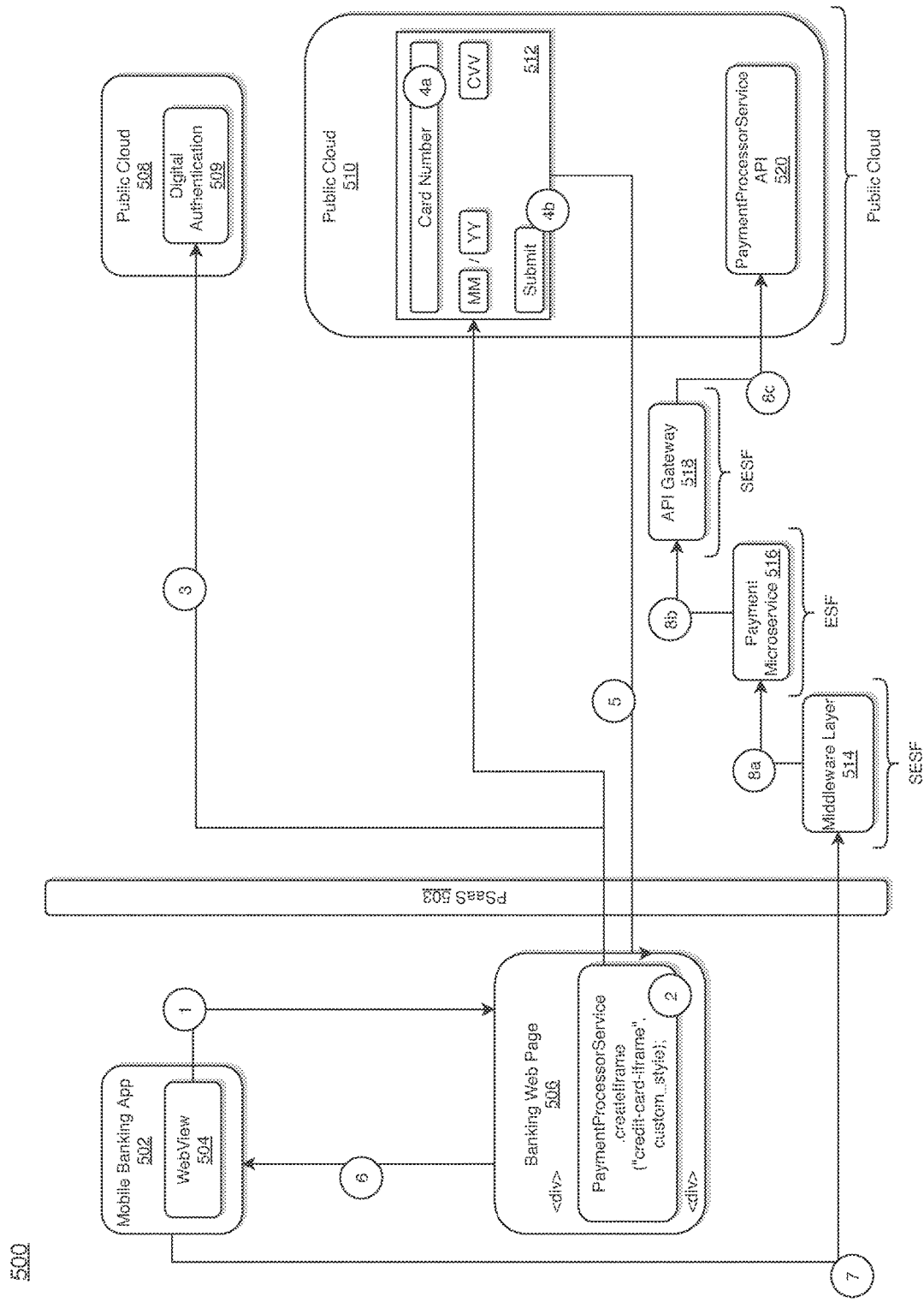
FIG. 5 illustrates an exemplary architecture diagram that implements a method for directly accepting a payment on an application in accordance with an exemplary embodiment.

FIG. 5 illustrates an exemplary architecture diagram 500 that implements a method for directly accepting a payment on an application in accordance with an exemplary embodiment. As illustrated in FIG. 5, the architecture diagram 500 may include a mobile banking application 502 having a system component (e.g., WebView) 504, physical security as a service (PSaaS) 503, a personal online page 506 (i.e., personal online banking web page), one or more public clouds 508, 510, tokenized credit card information 512, DPS 514, quick collect payment micro service 516. API gateway 518, and payment service (e.g., Payment processor service) API 520.

According to exemplary embodiments, the WebView 504 may be a system component powered by Google Chrome that allows Android applications to display web content. According to exemplary embodiments, this WebView 504 system component may be pre-installed on the client device 408(1)-408(n) and should be kept up to date to ensure latest security updates and other bug fixes.

The payment service (i.e., payment processor service) may be configured to provide an integrated and customizable payment solution through its APIs to platform businesses and may provide fraud and risk protection.

The PSaaS 503 may provide a cloud computing solution for businesses to free the load of internal management of their people and buildings security.

According to exemplary embodiments, implementation of a payment accepting application that allows clients to accept card payments from customers directly on the payment accepting application will be described with reference to FIGS. 4-5.

According to exemplary embodiments, the receiving module 414 may be configured to receive login information from a client to activate a banking application (e.g., mobile banking application 502). The selecting module 416 may be configured to allow selecting quick accept entry points associated with the client's DDA based on determining that the client is eligible for the quick accept entry points in response to the login information.

According to exemplary embodiments, the setting module 418 may be configured to set up a payment receiving option for receiving a payment via the banking application (i.e., mobile banking application 502). The receiving module 414 may be configured to receive, by the banking application (i.e., mobile banking application 502), transaction amount data corresponding to a transaction between the client and a customer. The processing module 422 may be configured to process (i.e., by the DPS 514) the transaction amount data. The updating module 424 may be configured to automatically update the DDA to reflect receipt of the transaction amount data. The update may be performed in near real-time or within twenty four (24) hours of processing the transaction amount data.

According to exemplary embodiments, in processing the transaction amount data, the receiving module 414 may be further configured to cause the banking application (i.e., mobile banking application 502) to receive card information for charging the transaction amount data and the processing module 422 may be configured to process (i.e., by the DPS 514) the transaction amount data based on the card information.

According to exemplary embodiments, in processing the transaction amount data, the PAM 406 may be configured to display a plurality of selectable card reader devices on a dashboard of the banking application (i.e., mobile banking application 502). The plurality of selectable card reader devices are configured to be paired with the banking application (i.e., mobile banking application 502) via a wireless communication that is performed in accordance with a Bluetooth standard. The pairing module 426 may be configured to pair, for one-time use only, the banking application (i.e., mobile banking application 502) with a desired card reader device from the plurality of selectable card reader devices via the Bluetooth standard. According to exemplary embodiments, the card reader device may include a terminal that is configured to obtain the transaction amount data from a card that is associated with customer. The accepting module 428 may be configured to accept payment of the transaction amount data in response to dipping, or swiping, or tapping the card.

According to exemplary embodiments, in processing the transaction amount data, a card reader device may be connected with a mobile device that implemented the banking application (i.e., mobile banking application 502) via a wired communication that is performed in accordance with a Universal Serial Bus (USB) standard. According to exemplary embodiments, the card reader device may include a terminal that is configured to obtain the transaction amount data from a card that is associated with the customer. The accepting module 428 may be configured to accept payment of the transaction amount data in response to dipping, or swiping, or tapping the card.

According to exemplary embodiments, the communication module 434 may establish a communication between the banking application (i.e., mobile banking application 502) and an email server (i.e., server 404) that serves an email account of the customer. The transmitting module 432 may be configured to transmit an email notification attaching a receipt to the email account of the customer upon receipt of the transaction amount data.

According to exemplary embodiments, the accessing module 430 may be configured to access reporting data on charge and settlement associated with the transaction amount data from within the banking application (i.e., mobile banking application 502) on a mobile device of the client.

According to exemplary embodiments, the accessing module 430 may be configured access reporting data on charge and settlement associated with the transaction amount data from within the business banking DDA of the client held by a financial institution.

The architecture diagram 500 which illustrates an iFrame payment solution as illustrated in FIG. 5 will be described in accordance with exemplary embodiments, but the disclosure is not limited thereto.

For example, in the architecture diagram 500 of FIG. 5, at step 1, the mobile banking application 502 may embed a WebView 504 for card (i.e., credit card, debit card, etc.) acceptance with an html page (i.e., Banking web page 506) with Payment processor service JavaScript SDK.

According to exemplary embodiments, in the architecture diagram 500 of FIG. 5, at step 2, the html page (i.e., banking web page 506) may be site minder protected may be built based on the Payment processor service provided tokenization iFrame Payment processor service JavaScript Library. It may perform the following: i) initialize Payment processor service library; ii) specify the id of the container for the Payment processor service credit card tokenization form; iii) generate and render card (i.e., credit card, debit card, etc.) tokenization form; and iv) configure submit button to perform tokenization and handle tokenization response, but the disclosure is not limited thereto.

According to exemplary embodiments, in the architecture diagram 500 of FIG. 5, at step 3, Payment processor service JavaScript performs device fraud check using a digital authentication enterprise solution for digital identity intelligence and digital authentication 509 (i.e. ThreatMetrix® Digital Authentication).

According to exemplary embodiments, in the architecture diagram 500 of FIG. 5, at step 4a, Payment processor service renders its iFrame with fields to accept the card (i.e., credit card, debit card, etc.).

According to exemplary embodiments, in the architecture diagram 500 of FIG. 5, at step 4b, Payment processor service tokenizes the customer entered card information.

According to exemplary embodiments, in the architecture diagram 500 of FIG. 5, at step 5, Payment processor service invokes html's postMessage method of the invoking webpage and send the tokenized information.

According to exemplary embodiments, in the architecture diagram 500 of FIG. 5, at step 6. Payment processor service's JavaScript library captures the message and posts the token back to the calling mobile banking application's 502 WebView 504.

According to exemplary embodiments, in the architecture diagram 500 of FIG. 5, at step 7, the mobile banking application 502 calls payment service (i.e., payment microservice 516) method (via DPS 514) with token and other payment info such as amount for payment processing.

According to exemplary embodiments, in the architecture diagram 500 of FIG. 5, at steps 8a-8c, the payment service (i.e., payment microservice 516) invokes Payment processor service payment API 520 via API gateway 518 to process the payment.

Referring to FIGS. 4 and 5, according to exemplary embodiments, the PAM 406 is configured for a shared UI across all line of business (LOB) to provide the needed function. For example, UI work for key interactions may be built using ASI framework—not natively built into servicing applications, thereby improving efficiency, but the disclosure is not limited thereto.

For example, data needs to be consistently captured across all LOB servicing apps and instead of building that logic natively using the LOB servicing UI's, according to exemplary embodiments, the module is built once using ASI and that module will be consumed by all LOB's to provide the needed function, but the disclosure is not limited thereto.

According to exemplary embodiments, the PAM 406 is configured such that a mobile banking application 502 user may be notified that a new on-the-go payment method has been introduced. To achieve this goal, according to exemplary embodiments, for mobile, the PAM 406 provides a user interface as per DCE show card reader payment method and ordering information, but the disclosure is not limited thereto.

According to exemplary embodiments, the PAM 406 may provide a platform for a customer to order a card reader, and to utilize the platform to pay for the card reader via a debit of user checking account. For example for mobile, the PAM 406 is configured such that it provides a link for customer to click to open a new browser window with a portal choosing compatible readers and accessories, identifying shipping location and type, paying for the reader or tracking existing order, but the disclosure is not limited thereto. For the portal, the PAM 406 is configured such that the portal may produce an ADA compliant Chase branded experience; allow customer to review the details including cost of the compatible card reader and accessories; allow customer to order the selected card reader and accessories, allow customer to enter shipping address and shipping type; allow customer to pay for the order via credit card or debit card; allow customer to check out as logged in user or guest; allow customer to track the order placed, but the disclosure is not limited thereto.

According to exemplary embodiments, the PAM 406 may provide a platform for a customer who ordered a card reader to see the confirmation of that order on the mobile screen. For example, the portal will produce confirmation screen upon ordering the card reader. The portal will also have order history to view and track ordered card readers.

According to exemplary embodiments, the PAM 406 may provide a platform for a customer to pair the mobile card reader with mobile application for both IOS and Android.

For example, for mobile/mobile framework, according to exemplary embodiments, the PAM 406 is configured such that it is integrated with Payment processor service card reader SDK; invokes payment microservice 516 to generate session token; builds initialization interface with Payment processor service SDK (with session token); builds the pairing LED screens; invokes Payment processor service SDKs to confirm LED pattern/sequence, but the disclosure is not limited thereto. For the payment microservice 516, session token API may be created by invoking Payment processor service's generate_session_token, but the disclosure is not limited thereto.

For experience service, an API interface may be built for generating session token. For the API gateway 518, the PAM 406 may create generate session token API for Payment processor service's generate_session_token API and may also create generate session token for payment microservice API. The PAM 406 may be further configured to update Payment processor service SDK with PCI Ingenico card reader SDK, but the disclosure is not limited thereto.

According to exemplary embodiments, the PAM 406 is configured such that a customer who has already paired a mobile card reader, the mobile card reader should automatically get connected with the customer's mobile device when the customer logins to the mobile banking application 502 using the customer's existing credentials. For example, it allows interfacing with Payment processor service SDK for authorizing payment through the mobile card reader.

According to exemplary embodiments, the PAM 406 is configured such that a customer may capture payments from customers using the card reader associated with the customer's iOS or Android mobile device via Bluetooth.

For example, for mobile, the PAM 406 is configured such that it may: build card reader payment screens; invoke getSessionToken API from payment experience microservice (not shown) and call initialize on Payment processor service SDK; capture SDK event for authorization complete and capture encoded_payment_method and invoke payment API from payment experience microservice, but the disclosure is not limited thereto.

For payment microservice 516, the PAM 406 is configured such that it may: build a new API to get the session token (API should call Payment processor service's/session_tokens via API gateway 518); modify payment API to capture the payments processed through the card reader. Payment method type used should encoded_payment_method. Sample request Jason may include the following:

```
{
    "amount": 100,
    "currency": "USD",
    "payment_method": {
        "type": "encoded_payment_method",
        "encoded_payment_method":
            "poseyJ0aXBfYW1vdW50IjowLCJhbW91 . . ."
    },
    "account_id": "{{merchant_account_id}}",
    "auto_capture": true
}
```

For API gateway 518, the PAM 406 is configured such that it may: onboard new API for Payment processor service's/session_tokens: onboard payment microservice's 516 and experience service's methodx get session token; modify payment API for Payment processor service's payment API to capture the payments after the payment has been processed; modify payment API to capture payment to be used by experience service, but the disclosure is not limited thereto.

According to exemplary embodiments, the PAM 406 is configured such that a customer may be able to use the functionality while physically in the fifty (50) USA states.

For example, for mobile, the PAM 406 is configured such that it may: determine whether the location services is turned on for the device; prompt user to enable location service is not ON; determine longitude and latitude of the device; pass the longitude and latitude into the modified payment microservice call. If the payment returns failure code PAYMENT_NOT_ALLOW_ED_FOR_CLIENT_LOCATION, show the user error stating payment cannot be processed outside the country.

For the payment microservice 516, the PAM 406 is configured such that it may: modify payment method to include input parameter for longitude and latitude of the client; payment method to invoke geo-fencing utility to determine if the longitude and latitude is within USA or not. If the utility returns false to indicate that passed location is not in the USA, return a specific error code, e.g. as follows: PAYMENT_NOT_ALLOWED_FOR_CLIENT_LOCATION. The PAM 406 is also configured such that it may: build geo-fencing utility function to return TRUE if the longitude and latitude passed are within USA or return FALSE if the longitude and latitude are not within USA. To make this determine, the PAM 406 may utilize the following: predefined Longitude/Latitude pair of USA boundary stored in a file; use a polygon checker utility to scan the file (in memory scan) to infer if the passed longitude and latitude are inside the USA.

For payment experience service, the PAM 406 is configured such that it may: modify payment method to include input parameter for longitude and latitude of the client.

For API gateway 518, the PAM 406 is configured such that it may: modify payment method to include input parameter for longitude and latitude in payment experience and microservice 516.

According to exemplary embodiments, the PAM 406 is configured such that a user may be able to track usage of every screen including entry and exit paths, unique users, page views, visits, time spent on page and similar usage characteristics to understand customer usage patterns.

Typical retail banking application is not designed for accepting credit card payment. Accepting credit card payment may involve challenges related to complying with PCI-DSS, which may prove to be a huge burden on the application to handle the sensitive data on its platform. According to exemplary embodiments, the PAM 406 may be configured in a manner as disclosed above such that a client can accept credit card payment from his/her customer via the mobile banking application 502 by key in the 15/16 digit credit or debit card number and still keeping the mobile banking application 502 outside of PCI-DSS compliance scope.

According to exemplary embodiments, the PAM 406 may be configured in a manner such that the mobile banking application 502 may accept payment remotely (e.g., via a link to capture payment remotely), but the disclosure is not limited thereto. For example, according to exemplary embodiments, the payment accept method disclosed herein is not limited to utilizing the mobile banking application 502 for accepting payment. Rather, the payment accept method disclosed herein may be utilized by another form factor like web channel or desktop to accept payment.

Figure 6:
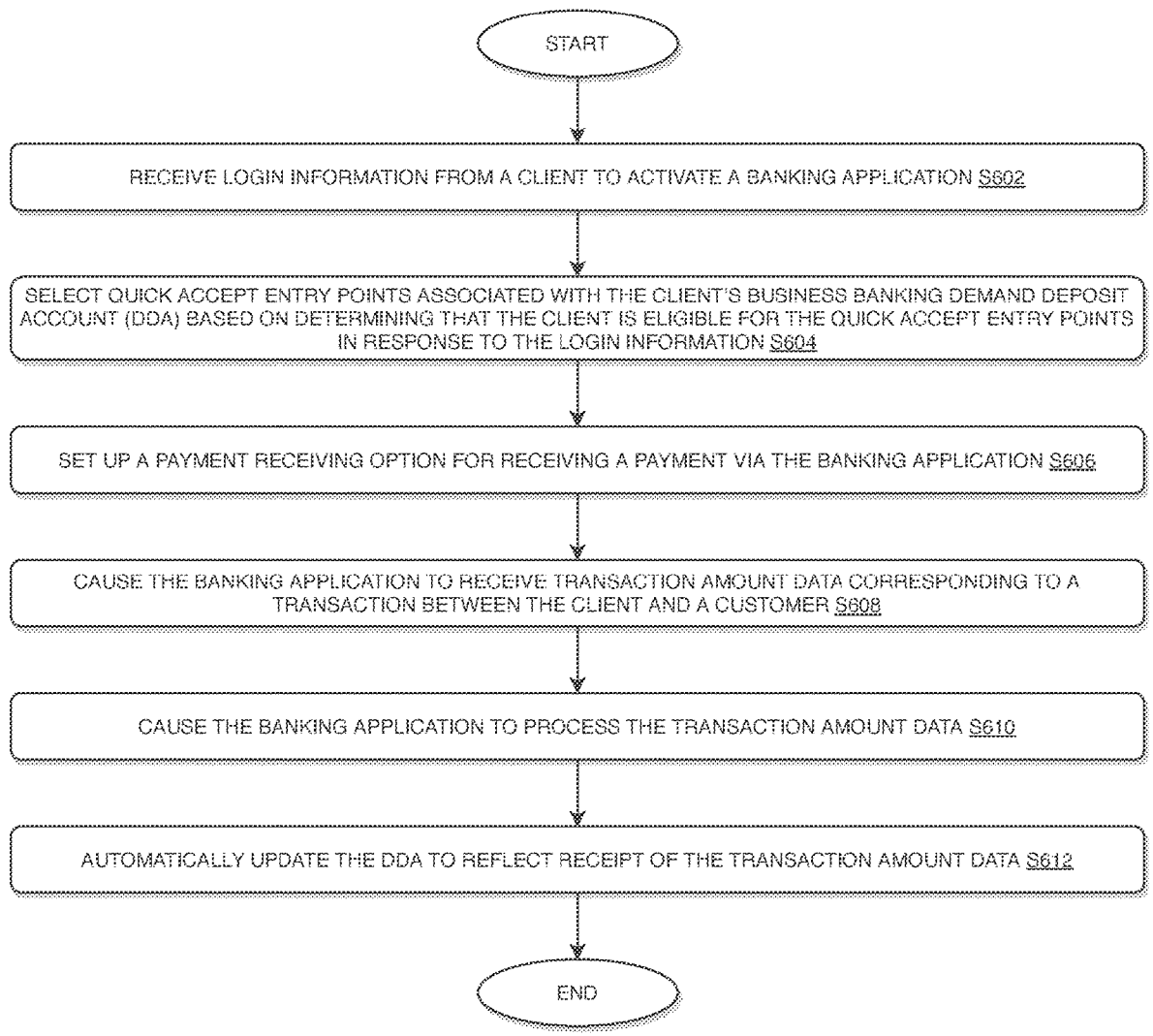
FIG. 6 illustrates a flow chart of implementing a method for directly accepting a payment on an application in accordance with an exemplary embodiment.

FIG. 6 illustrates a flow chart of implementing a method for directly accepting a payment on an application in accordance with an exemplary embodiment.

At step S602, the process 600 may include receiving login information from a client to activate a banking application.

At step S604, the process 600 may include selecting quick accept entry points associated with the client's business banking demand deposit account (DDA) based on determining that the client is eligible for the quick accept entry points in response to the login information.

At step S606, the process 600 may include setting up a payment receiving option for receiving a payment via the banking application.

At step S608, the process 600 may include causing the banking application to receive transaction amount data corresponding to a transaction between the client and a customer.

At step S610, the process 600 may include causing the banking application to process the transaction amount data.

At step S612, the process 600 may include automatically updating the DDA to reflect receipt of the transaction amount data.

According to exemplary embodiments, in processing the transaction amount data, the process 600 may further include: receiving, by the banking application, card information for charging the transaction amount data; and processing, by the banking application, the transaction amount data based on the card information.

According to exemplary embodiments, in processing the transaction amount data, the process 600 may further include: displaying a plurality of selectable card reader devices on a dashboard of the banking application, wherein the plurality of selectable card reader devices are configured to be paired with the banking application via a wireless communication that is performed in accordance with a Bluetooth standard; pairing, for one-time use only, the banking application with a desired card reader device from the plurality of selectable card reader devices via the Bluetooth standard, wherein the card reader device includes a terminal that is configured to obtain the transaction amount data from a card that is associated with customer; and accepting payment of the transaction amount data in response to dipping, or swiping, or tapping the card.

According to exemplary embodiments, in processing the transaction amount data, the process 600 may further include: connecting a card reader device with the banking application via a wired communication that is performed in accordance with a Universal Serial Bus (USB) standard, wherein the card reader device includes a terminal that is configured to obtain the transaction amount data from a card that is associated with the customer; and accepting payment of the transaction amount data in response to dipping, or swiping, or tapping the card.

According to exemplary embodiments, the process 600 may further include: establishing a communication between the banking application and an email server that serves an email account of the customer; and transmitting an email notification attaching a receipt to the email account of the customer upon receipt of the transaction amount data.

According to exemplary embodiments, the process 600 may further include accessing reporting data on charge and settlement associated with the transaction amount data from within the banking application on a mobile device of the client.

According to exemplary embodiments, the process 600 may further include accessing reporting data on charge and settlement associated with the transaction amount data from within the business banking DDA of the client held by a financial institution.

According to exemplary embodiments, the PAD 402 may include a memory (e.g., a memory 106 as illustrated in FIG. 1) which may be a non-transitory computer readable medium that may be configured to store instructions for implementing PAM 406 for implementing a process of accepting a payment on an application. The computing device PAD 402 may also include a medium reader (e.g., a medium reader 112 as illustrated in FIG. 1) which may be configured to read any one or more sets of instructions. e.g., software, from any of the memories described herein. The instructions, when executed by a processor embedded within the PAM 406 or within the PAD 402, may be used to perform one or more of the methods and processes as described herein. In a particular embodiment, the instructions may reside completely, or at least partially, within the memory 106, the medium reader 112, and/or the processor 104 (see FIG. 1) during execution by the PAD 402.

For example, the instructions, when executed, may cause the processor 104 to perform the following: receive login information from a client to activate a banking application; select quick accept entry points associated with the client's business banking demand deposit account (DDA) based on determining that the client is eligible for the quick accept entry points in response to the login information; set up a payment receiving option for receiving a payment via the banking application; cause the banking application to receive transaction amount data corresponding to a transaction between the client and a customer; cause the banking application to process the transaction amount data; and automatically update the DDA to reflect receipt of the transaction amount data.

According to exemplary embodiments, to process the transaction amount data, the instructions, when executed by the processor 104, may cause the processor 104 to further perform the following: cause the banking application to receive card information for charging the transaction amount data; and cause the banking application to process the transaction amount data based on the card information.

According exemplary embodiments, to process the transaction amount data, the instructions, when executed by the processor 104, may cause the processor 104 to further perform the following: display a plurality of selectable card reader devices on a dashboard of the banking application, wherein the plurality of selectable card reader devices are configured to be paired with the banking application via a wireless communication that is performed in accordance with a Bluetooth standard; pair, for one-time use only, the banking application with a desired card reader device from the plurality of selectable card reader devices via the Bluetooth standard, wherein the card reader device includes a terminal that is configured to obtain the transaction amount data from a card that is associated with customer; and accept payment of the transaction amount data in response to dipping, or swiping, or tapping the card.

According to exemplary embodiments, to process the transaction amount data, the instructions, when executed by the processor 104, may cause the processor 104 to further perform the following: establish a communication link between a card reader device and the banking application via a wired communication that is performed in accordance with a Universal Serial Bus (USB) standard, wherein the card reader device includes a terminal that is configured to obtain the transaction amount data from a card that is associated with the customer; and accept a payment of the transaction amount data in response to dipping, or swiping, or tapping the card.

According to exemplary embodiments, the instructions, when executed by the processor 104, may cause the processor 104 to further perform the following: establish a communication link between the banking application and an email server that serves an email account of the customer; and transmit an email notification attaching a receipt to the email account of the customer upon receipt of the transaction amount data.

According to exemplary embodiments, the instructions, when executed by the processor 104, may cause the processor 104 to further perform the following: access reporting data on charge and settlement associated with the transaction amount data from within the banking application on a mobile device of the client.

According to exemplary embodiments, the instructions, when executed by the processor 104, may cause the processor 104 to further perform the following: access reporting data on charge and settlement associated with the transaction amount data from within the business banking DDA of the client held by a financial institution.

Thus, the exemplary embodiments disclosed herein with reference to FIGS. 1-6 may provide platforms for implementing the PAD 202 which may be configured to implement a payment accepting application that allows clients to accept card payments from customers directly on the payment accepting application, with automatic settlement to the clients' DDA, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for accepting a payment on an application, the method being implemented by at least one processor and one or more memories, the method comprising:
receiving login information from a client to activate a banking application;
selecting a first set of entry points associated with the client's business banking demand deposit account (DDA) based on determining that the client is eligible for the first set of entry points in response to the login information;
setting up a payment receiving option for receiving a payment via the banking application;
utilizing, to perform a device fraud check, a digital authentication enterprise solution for digital identity intelligence and digital authentication;
receiving, by the banking application, from a customer, credit card information for a transaction between the client and the customer, wherein the transaction between the client and the customer comprises transaction amount data;
initializing a library of a payment processor service;
identifying a container for a credit card tokenization form of the payment processor service;
generating and rendering the credit card tokenization form;
configuring a virtual button that submits a response to the credit card tokenization form when the virtual button in selected;
receiving, from the payment processor service, a tokenized version of the credit card information;
receiving, by the banking application, the transaction amount data corresponding to the transaction between the client and the customer;
complying, by the banking application, with Payment and Card Industry-Data Security Standard (PCI-DSS) by utilizing a physical security as a service (PSaaS) platform to process the transaction amount data based on the credit card information; and
automatically updating the DDA to reflect receipt of the transaction amount data.

2. The method according to claim 1, wherein processing the transaction amount data further comprises:
displaying a plurality of selectable card reader devices on a dashboard of the banking application, wherein the plurality of selectable card reader devices are configured to be paired with the banking application via a wireless communication that is performed in accordance with a Bluetooth standard;
pairing, for one-time use only, the banking application with a desired card reader device from the plurality of selectable card reader devices via the Bluetooth standard, wherein the card reader device includes a terminal that is configured to obtain the transaction amount data from a card that is associated with customer; and
accepting payment of the transaction amount data in response to dipping, or swiping, or tapping the card.

3. The method according to claim 1, wherein processing the transaction amount data further comprises:
connecting a card reader device with the banking application via a wired communication that is performed in accordance with a Universal Serial Bus (USB) standard, wherein the card reader device includes a terminal that is configured to obtain the transaction amount data from a card that is associated with the customer; and
accepting payment of the transaction amount data in response to dipping, or swiping, or tapping the card.

4. The method according to claim 1, further comprising:
establishing a communication between the banking application and an email server that serves an email account of the customer; and
transmitting an email notification attaching a receipt to the email account of the customer upon receipt of the transaction amount data.

5. The method according to claim 1, further comprising:
accessing reporting data on charge and settlement associated with the transaction amount data from within the banking application on a mobile device of the client.

6. The method according to claim 1, further comprising:
accessing reporting data on charge and settlement associated with the transaction amount data from within the business banking DDA of the client held by a financial institution.

7. A system for accepting a payment on an application, the system comprising:
a processor; and
one or more memories operatively connected to the processor via a communication network, wherein the processor is configured to:
receive login information from a client to activate a banking application;
select a first set of entry points associated with the client's business banking demand deposit account (DDA) based on determining that the client is eligible for the first set of entry points in response to the login information;
set up a payment receiving option for receiving a payment via the banking application;
utilize, to perform a device fraud check, a digital authentication enterprise solution for digital identity intelligence and digital authentication;
cause the banking application to receive, from a customer, credit card information for a transaction between the client and the customer, wherein the transaction between the client and the customer comprises transaction amount data;
initialize a library of a payment processor service;
identify a container for a credit card tokenization form of the payment processor service;
generate and render the credit card tokenization form;
configure a virtual button that submits a response to the credit card tokenization form when the virtual button in selected;
receive, from the payment processor service, a tokenized version of the credit card information;

cause the banking application to receive the transaction amount data corresponding to the transaction between the client and the customer;
cause the banking application to comply with Payment and Card Industry-Data Security Standard (PCI-DSS) by utilizing a physical security as a service (PSaaS) platform to process the transaction amount data based on the credit card information;
automatically update the DDA to reflect receipt of the transaction amount data.

8. The system according to claim 7, wherein, to process the transaction amount data, the processor is further configured to:
display a plurality of selectable card reader devices on a dashboard of the banking application, wherein the plurality of selectable card reader devices are configured to be paired with the banking application via a wireless communication that is performed in accordance with a Bluetooth standard;
pair, for one-time use only, the banking application with a desired card reader device from the plurality of selectable card reader devices via the Bluetooth standard, wherein the card reader device includes a terminal that is configured to obtain the transaction amount data from a card that is associated with customer; and
accept payment of the transaction amount data in response to dipping, or swiping, or tapping the card.

9. The system according to claim 7, wherein, to process the transaction amount data, the processor is further configured to:
establish a communication link between a card reader device and the banking application via a wired communication that is performed in accordance with a Universal Serial Bus (USB) standard, wherein the card reader device includes a terminal that is configured to obtain the transaction amount data from a card that is associated with the customer; and
accept a payment of the transaction amount data in response to dipping, or swiping, or tapping the card.

10. The system according to claim 7, further comprising:
establish a communication link between the banking application and an email server that serves an email account of the customer; and
transmit an email notification attaching a receipt to the email account of the customer upon receipt of the transaction amount data.

11. The system according to claim 7, further comprising:
access reporting data on charge and settlement associated with the transaction amount data from within the banking application on a mobile device of the client.

12. The system according to claim 7, further comprising:
access reporting data on charge and settlement associated with the transaction amount data from within the business banking DDA of the client held by a financial institution.

13. A non-transitory computer-readable medium configured to store instructions for accepting a payment on an application, wherein, when executed, the instructions cause a processor to perform the following:
receive login information from a client to activate a banking application;
select a first set of entry points associated with the client's business banking demand deposit account (DDA) based on determining that the client is eligible for the a first set of entry points in response to the login information;
set up a payment receiving option for receiving a payment via the banking application;
utilize, to perform a device fraud check, a digital authentication enterprise solution for digital identity intelligence and digital authentication;
cause the banking application to receive, from a customer, credit card information for a transaction between the client and the customer, wherein the transaction between the client and the customer comprises transaction amount data;
initialize a library of a payment processor service;
identify a container for a credit card tokenization form of the payment processor service;
generate and render the credit card tokenization form;
configure a virtual button that submits a response to the credit card tokenization form when the virtual button in selected;
receive, from the payment processor service, a tokenized version of the credit card information;
cause the banking application to receive the transaction amount data corresponding to the transaction between the client and the customer;
cause the banking application to comply with Payment and Card Industry-Data Security Standard (PCI-DSS) by utilizing a physical security as a service (PSaaS) platform to process the transaction amount data based on the credit card information;
automatically update the DDA to reflect receipt of the transaction amount data.

14. The non-transitory computer-readable medium of claim 13, wherein, to process the transaction amount data, the instructions, when executed by the processor, cause the processor to further perform the following:
display a plurality of selectable card reader devices on a dashboard of the banking application, wherein the plurality of selectable card reader devices are configured to be paired with the banking application via a wireless communication that is performed in accordance with a Bluetooth standard;
pair, for one-time use only, the banking application with a desired card reader device from the plurality of selectable card reader devices via the Bluetooth standard, wherein the card reader device includes a terminal that is configured to obtain the transaction amount data from a card that is associated with customer; and
accept payment of the transaction amount data in response to dipping, or swiping, or tapping the card.

15. The non-transitory computer-readable medium of claim 13, wherein, to process the transaction amount data, the instructions, when executed by the processor, cause the processor to further perform the following:
establish a communication link between a card reader device and the banking application via a wired communication that is performed in accordance with a Universal Serial Bus (USB) standard, wherein the card reader device includes a terminal that is configured to obtain the transaction amount data from a card that is associated with the customer; and
accept a payment of the transaction amount data in response to dipping, or swiping, or tapping the card.

16. The non-transitory computer-readable medium according to claim 13, the instructions, when executed by the processor, cause the processor to further perform the following:
establish a communication link between the banking application and an email server that serves an email account of the customer; and transmit an email notification attaching a receipt to the email account of the customer upon receipt of the transaction amount data.

17. The non-transitory computer-readable medium according to claim 13, the instructions, when executed by the processor, cause the processor to further perform one of the following:
   access reporting data on charge and settlement associated with the transaction amount data from within the banking application on a mobile device of the client, or access reporting data on charge and settlement associated with the transaction amount data from within the business banking DDA of the client held by a financial institution.

18. The method according to claim 1, further comprising:
   determining whether location services are active;
   when the location services are inactive, prompting a user to enable the location services;
   determining the location of the user;
   determining whether the banking application is permitted to accept payments that are received from the location of the user; and
   when the banking application is not permitted to accept payments that are received from the location of the user, providing the user with an indication that the banking application is not permitted to accept payments that are received from the location of the user.

19. The system according to claim 7, wherein the processor is further configured to:
   determine whether location services are active;
   when the location services are inactive, prompt a user to enable the location services;
   determine the location of the user;
   determine whether the banking application is permitted to accept payments that are received from the location of the user; and
   when the banking application is not permitted to accept payments that are received from the location of the user, provide the user with an indication that the banking application is not permitted to accept payments that are received from the location of the user.

20. The non-transitory computer-readable medium according to claim 15, wherein the instruction are further configured to:
   determine whether location services are active;
   when the location services are inactive, prompt a user to enable the location services;
   determine the location of the user;
   determine whether the banking application is permitted to accept payments that are received from the location of the user; and
   when the banking application is not permitted to accept payments that are received from the location of the user, provide the user with an indication that the banking application is not permitted to accept payments that are received from the location of the user.

* * * * *